(12) United States Patent
Bjorkman et al.

(10) Patent No.: US 10,197,094 B2
(45) Date of Patent: *Feb. 5, 2019

(54) DOUBLE-ROW SPHERICAL ROLLER BEARING

(71) Applicant: Aktiebolaget SKF, Gothenburg OT (SE)

(72) Inventors: Emma Bjorkman, Trollhättan (SE); Peter James, Mölndal (SE); Marcus Loof, Nol (SE); Lars Stigsjöö, Angered (SE)

(73) Assignee: Aktiebolaget SKF, Göteborg (SE)

( * ) Notice: Subject to any disclaimer, the term of this patent is extended or adjusted under 35 U.S.C. 154(b) by 311 days.

This patent is subject to a terminal disclaimer.

(21) Appl. No.: 14/969,700

(22) Filed: Dec. 15, 2015

(65) Prior Publication Data

US 2016/0178002 A1 Jun. 23, 2016

(30) Foreign Application Priority Data

Dec. 19, 2014 (SE) ........................................ 1451595

(51) Int. Cl.
 *F03D 80/70* (2016.01)
 *F16C 19/38* (2006.01)
 (Continued)

(52) U.S. Cl.
 CPC ............ *F16C 23/086* (2013.01); *F03D 80/70* (2016.05); *F16C 33/585* (2013.01);
 (Continued)

(58) Field of Classification Search
 CPC ...... F16C 19/38; F16C 23/082; F16C 23/086; F16C 33/585; F16C 33/586;
 (Continued)

(56) References Cited

U.S. PATENT DOCUMENTS 5,441,351 A * 8/1995 Grunze ................. F16C 23/086
 384/450
9,227,720 B2 * 1/2016 Habibvand ........... F16C 33/783
 (Continued)

FOREIGN PATENT DOCUMENTS

CN 201003544 Y 1/2008
CN 101769321 A 7/2010
 (Continued)

*Primary Examiner* — James Pilkington
(74) *Attorney, Agent, or Firm* — Bryan Peckjian; SKF USA Inc. Patent Dept.

(57) ABSTRACT

A double-row spherical roller bearing, comprising: an outer ring having an radially inner spherical raceway and a radially outer peripheral surface, an inner ring having a radially outer curved-shaped raceway, and roller elements arranged in two axially displaced rows. The outer ring includes an outer peripheral surface first circumferential groove. The first circumferential groove has an axial outer peripheral surface width X fulfilling the following relation:

$$L_1 \leq X \leq L_2,$$

$L_2$ extends between first end point (intersecting the first normal vector and the outer peripheral surface) and second outer peripheral surface axial end points (intersecting a second normal vector and the outer peripheral surface). The first normal vector is an inverted normal vector of the outer raceway. The second normal vector is an inverted normal vector of the inner raceway. $L_1$ has a length of $L_2 * \frac{1}{3}$. End points of $L_1$ are located equidistant to each respective first and second end point of $L_2$.

13 Claims, 4 Drawing Sheets

(51) Int. Cl.
*F16C 23/08* (2006.01)
*F16C 33/58* (2006.01)

(52) U.S. Cl.
CPC ............ *F16C 33/586* (2013.01); *F16C 19/38* (2013.01); *F16C 2300/14* (2013.01); *F16C 2360/31* (2013.01)

(58) Field of Classification Search
CPC .............. F16C 33/6622; F16C 33/6659; F16C 2360/31; F03D 80/70
See application file for complete search history.

(56) References Cited

U.S. PATENT DOCUMENTS

2008/0037921 A1* 2/2008 Hoshino .............. F16C 23/086
 384/558
2010/0058593 A1 3/2010 Kurashita
2010/0150486 A1* 6/2010 Kuppuraju ............ F16C 23/086
 384/486

FOREIGN PATENT DOCUMENTS

| CN | 203214602 U | 9/2013 |
| DE | 102005027280 A1 | 1/2007 |
| FR | 3006728 A1 | 12/2014 |
| JP | 2013234690 A | 11/2013 |

* cited by examiner

DOUBLE-ROW SPHERICAL ROLLER BEARING

CROSS REFERENCE TO RELATED APPLICATION

This is a Non-Provisional Patent Application, filed under the Paris Convention, claiming the benefit of Sweden (SE) Patent Application Number 1451595-1, filed on 19 Dec. 2014 (19.12.2014), which is incorporated herein by reference in its entirety.

TECHNICAL FIELD

According to a first aspect, the present disclosure relates to spherical roller bearings. More specifically, the present disclosure pertains to a spherical roller bearing comprising a circumferential groove on its outer ring.

According to a second aspect of the disclosure, the present disclosure pertains to a wind turbine rotor shaft bearing arrangement.

BACKGROUND OF THE PRESENT INVENTION

Rolling bearings are common mechanical elements that are used in many different applications. There are different kinds of rolling bearings, which are designed to fulfill different requirements. Depending on the conditions of a specific application, i.e. load level, rotation speed, temperature etc., there are different kinds of suitable rolling bearings. One bearing type is spherical roller bearing (SRB). This bearing is designed to accommodate large radial loads and some axial loads, but also it is designed to be able to accommodate shaft deflections, i.e. the bearing rings are able to be relatively misaligned. Thus, this bearing is especially suitable for more demanding industrial applications, such as machines in pulp & paper industry, wind turbines etc.

For some SRB types there is a groove on the outer ring, in which groove there are a number of lubrication bores. The groove is designed to be as narrow as possible for not affecting the load carrying capacity of the bearing. The purpose of the groove is to receive lubricant from the outside and to therefrom enter the lubricant into the inside of the bearing via the lubrication bores. The lubricant may for example be oil or grease.

For most rolling bearing types, including SRB, there may be an advantage to standardize the design so it is applicable to several different applications. On the other hand, in recent years, the need for more customized bearings has been recognized to even better fulfill certain customer needs.

SUMMARY OF THE PRESENT INVENTION

In view of the above, it is the object of the present disclosure to provide a new and improved spherical roller bearing design.

These and other objects are met by the subject matters provided in the independent claims. Preferred and exemplary embodiments can be found in the dependent claims and in the accompanying description. According to the first aspect of the disclosure, the object has been achieved by a double-row spherical roller bearing, comprising, an outer ring presenting at least one radially inner spherical raceway and a radially outer peripheral surface. The bearing further comprises an inner ring presenting at least one radially outer curved-shaped raceway, roller elements arranged in two roller rows which are axially displaced, and wherein the rollers are arranged in-between the inner raceway of the outer ring and the at least one outer raceway of the inner ring. Moreover, the roller elements in each roller row presents a nominal roller position in the bearing, wherein the outer ring presents a first circumferential groove on the outer peripheral surface and wherein the first circumferential groove has a width X and location on the outer peripheral surface which fulfills the following relation:

$$L_1 \leq X \leq L_2,$$

wherein $L_2$ extends between a first and second axial end point on the outer peripheral surface, which first end point is defined as the intersection between a first normal vector and the outer peripheral surface, wherein the first normal vector is an inverted normal vector of the at least one inner raceway and starts from a position located at the axially inner end face of a roller in the first roller row at its nominal roller position, and which second end point is defined as the intersection between a second normal vector and the outer peripheral surface, wherein the second normal vector is an inverted normal vector of the at least one inner raceway and starts from a position located at the axially inner end face of a roller in the second roller row at its nominal roller position. Furthermore, $L_1$ has a length of $L_2 * \frac{1}{3}$ and where the end points of $L_1$ are located with equal distances to each respective first and second end point of $L_2$.

By nominal roller position is meant the position of the roller when the roller center point is located along the axis of the contact angle of the roller bearing. Furthermore the rotational axis of the roller is perpendicular to the axis of the contact angle. In addition, the roller raceway is in contact with the inner ring raceway. The roller center point is on the plane defined by the rollers' largest diameter and which is perpendicular to the roller rotational axis. The contact angle of one of the rollers in one of the roller rows of the bearing is defined as a line intersecting two points, wherein the first point is the center point of the sphere defined by the inner raceway of the outer ring located on the rotational axis of the bearing, and wherein the second point is the radial centre of the corresponding inner ring raceway surface.

In this document, axial and radial directions are mentioned and used to explain many of the features of this disclosure. Unless expressed otherwise for any of the embodiments, axial direction is the direction following the rotational axis of the roller bearing, and wherein radial direction is the direction which is perpendicular to the rotational axis of the roller bearing.

It has been realized by the inventors that by providing a spherical roller bearing comprising a circumferential groove on the outer peripheral surface, the bearing's performance will be unaffected while the portion of the outer peripheral surface which is meant to be in contact and fitted into a housing can be significantly reduced. It has been discovered and realized that this design change brings several advantages. Due to the reduced area of the outer ring's mounting surface, the bearing fit in the housing can be improved. A reduced surface area may reduce the risk of tolerance errors on the outer surface of the outer ring. Therefore, the mounting precision may be improved. Furthermore, there is a cost advantage in having a reduced mounting surface. Since it is important, due to mounting precision, to have a high quality of this surface the manufacturing operation to create this surface is often expensive and especially time consuming. By reducing the size of this surface the cost in manufacturing the outer ring will be reduced. Therefore, in a preferred embodiment, the first circumferential groove has a width X which is as large as possible without affecting the bearing's performance significantly. The distance $L_2$ defines the largest possible axial width of the first circumferential groove without significantly affecting the area above the roller elements. When the bearing is exposed to a radial force, a stress region will be created in the proximity of the rolling contact surface between the rollers and the inner spherical raceway. If the first circumferential groove would be larger than $L_2$ the bearing's performance could be affected to an extent which might reduce the service life of the bearing.

In an embodiment of the present disclosure, a double-row spherical roller bearing is disclosed, wherein the axial width X is essentially constant in the circumferential direction of the first circumferential groove. In another embodiment, the distance X varies in the circumferential direction of the shaft. For manufacturing reasons, it is preferred to have a groove which is essentially constant in its axial direction to keep the manufacturing costs to a minimum. It might however be an advantage to make use of a varying axial width of the first circumferential groove. For instance, the groove may be made thinner in an area where the load is applied (loaded zone) when the bearing is in operation, and made wider in the unloaded zone. This would of course put higher demands on the bearing mounting procedure, i.e. to make sure that the bearing is mounted correctly taking into account the varying axial width of the groove and the load direction.

In an embodiment of the present disclosure, a double-row spherical roller bearing is disclosed, wherein the outer ring presents a second circumferential groove located on the at least one inner spherical raceway and axially between the first and second roller rows. It may also be advantageous to make a groove on the radially inner side of the outer ring in-between the two roller rows. As for the first circumferential groove, by having a groove on the radially inner side of the outer ring, the manufacturing process for making the inner raceway will be simplified. A reduced surface area needs to be processed which reduces cycle times in production. In addition, by having a groove, cooling of the turning and polishing tools will be improved. For instance, if the inner raceway is cup-polished, the risk of overheating of the cup will be reduced when there is a groove on the radially inner side of the outer ring which divides the inner raceway into two spherical inner raceways. In another embodiment, the second circumferential groove presents an axial width which is essentially constant in its circumferential direction. As for the first circumferential groove, it may be preferred due to manufacturing reasons to have a groove which has a width which is essentially constant in the circumferential direction. In a further embodiment, the second circumferential groove presents a varying axial width in the circumferential direction. Again, as for the first circumferential groove, it may be advantageous to have a varying width taking into account where the loaded zone and the unloaded zone of the bearing will be when in operation. In a further embodiment, the second circumferential groove presents an axial width being essentially similar as the axial width X of the first circumferential groove. The essentially similar width may be constant or varying in the circumferential direction. In a further embodiment, the second circumferential groove is essentially axially aligned with the first circumferential groove.

In an embodiment of the present disclosure, the second groove presents an axial width which is defined as:

$$(0.75 \text{ to } 0.97)*(OR_w-2*R_1)$$

wherein OR is the axial width of the outer ring and wherein $R_1$ is the axial length of the roller elements. It has namely been realized by the inventors that a groove which has such an axial extension as in the above identified interval leads to a cost-efficient solution, reduces tool wear of the hard machining tool, and further does not negatively affect the bearing's performance. In another embodiment of the present disclosure, the second groove presents an axial width where the factor in the interval between 0.75 and 0.97 is essentially 0.8.

In another embodiment of the present disclosure, a double-row spherical roller bearing is disclosed, wherein at least one of the first and second end point of $L_2$ is further angularly inwardly offset from the intersection point of the respective first and second normal vector on the outer peripheral surface by a distance dmis, wherein dmis is defined by the misalignment limit of the bearing. A spherical roller bearing presents a misalignment limitation which most often is based on the axial extension of the spherical surface on the radially inner side of the outer ring. If the bearing would be misaligned so that rollers will be partly outside the spherical inner surface, bearing performance could be affected negatively. Therefore the bearing's misalignment limit is most often set to the limit when the roller elements will reach the axial end of the spherical inner raceway surface. By displacing at least one of the end points by the misalignment limit of the bearing from the intersection of the respective first and second normal vector and the outer peripheral surface, the bearing's performance will be less affected, especially for applications where the bearing tends to be largely misaligned.

In another embodiment of the present disclosure, a double-row spherical roller bearing is disclosed, wherein at least one of the first and second end point of $L_2$ is further axially inwardly offset from the intersection point of the respective first and second normal vector on the outer peripheral surface by a distance daxd, wherein daxd is defined by the relative axial displaceability of the inner and outer ring. It is common that the inner and outer ring of the spherical roller bearing is relatively axially displaceable due to that a bearing clearance is present in the bearing. This may also be compensated for when designing the groove and its axial width.

In another embodiment of the present disclosure, the first groove presents an axial width X in-between $L_1$ and $L_2$ which is defined as:

$$X=(0.92 \text{ to } 0.96)*(OR_w-2*R_1)$$

wherein $OR_w$ is the axial width of the outer ring and wherein $R_1$ is the axial length of the roller elements. In another embodiment, the factor in the interval from 0.92 to 0.96 is essentially 0.95.

In an embodiment of the present disclosure, a double-row spherical roller bearing is disclosed, wherein $L_1$ is any of $L_2*0.4$ or $L_2*0.5$ or $L_2*0.6$ or $L_2*0.7$ or $L_2*0.8$ or $L_2*0.9$. In another embodiment, $L_1$ is any of 22, 24, 26, 28, 30, 32, 34, 36, 38, 40, 42, 44, 46, 48, or 50 mm (millimeters).

In an embodiment of the present disclosure, a double-row spherical roller bearing is disclosed, wherein the outer ring presents at least one radial lubrication bore for allowing lubricant to enter into the inside of the bearing in-between the outer and inner ring, wherein the at least one lubrication bore is located at the first circumferential groove. The bearing may be lubricated by e.g. oil or grease. The first circumferential groove may lead to that the lubrication of the inside of the bearing is improved. The lubricant may easier find its way from the relatively large groove into the bores and thereby this may lead to improved lubrication of the bearing.

In another embodiment of the present disclosure, a double-row spherical roller bearing is disclosed, wherein the first circumferential groove presents a radial depth being less than 6 mm. It may be advantageous to keep the depth of the groove to a minimum to thereby not affect bearing performance too much. In addition, in another embodiment, the groove volume is set to a level such that a pressure of the oil or grease will be enough for the lubrication to flow through the lubrication bores into the space in-between the inner and outer ring.

In another embodiment of the present disclosure, a double-row spherical roller bearing is disclosed, wherein the outer ring has been subjected to a hardening process, and wherein the outer peripheral surface is a hard turned surface, and wherein the first circumferential groove has not undergone any post-turning operation after it was hardened. By not subjecting the groove to any post-turning operation manufacturing cost for the outer ring can be reduced. In a further embodiment, the first circumferential groove has not been subjected to any post-treatment at all. It can easily be seen if the groove has been subjected for any post-treatment after the hardening process since the hardening operation will lead to that the hardened surface will get a somewhat black- or grey-colored appearance. Likewise, in a further embodiment, when there is a second circumferential groove, the second groove has neither been subjected to any post-turning operation. And in a further embodiment, the second groove has not been subjected to any post treatment at all after the hardening operation.

In an embodiment of the present disclosure, a double-row spherical roller bearing is disclosed, wherein the first circumferential groove presents a first and second radius at the axial ends of the groove, wherein the first and second radius is essentially 6-10 mm, or more preferably essentially 8 mm. By having an axial end shape of the groove on both axial ends of the groove with a radius of 6-10 mm, turning operation during manufacturing will be facilitated. The sizes of the most common turning tools leads to that this is a preferred radius, and more preferably the radii of the two axial ends is set to essentially 8 mm.

In another embodiment of the present disclosure, the double row spherical roller bearing is an asymmetric bearing presenting different contact angles of the two respective roller rows. In a further embodiment, the width of the rollers in each respective roller row is different.

In another embodiment of the present disclosure, a spherical roller bearing is disclosed, wherein the bearing presents a cage or retainer for the roller elements. The cage may for instance be a comb-shaped cage or a window shaped cage. The cage/retainer may also be made of different materials, such as steel, brass, plastics or sheet metal.

In a further embodiment of the present disclosure, a spherical roller bearing is disclosed, wherein the inner ring presents at least one flange on the axially outer side of at least one of the first or second roller row. The flange may function as a guiding flange to guide the rollers, but it may also be used during assembly of the bearing in order to prevent rollers from falling out from the bearing.

In a further embodiment of the present disclosure, the double-row spherical roller bearing is a large size roller bearing with an outer diameter of at least 500 mm. It has been realized by the inventors that the first circumferential groove, and also the second circumferential groove, are especially advantageous when the bearing is a large bearing.

In another embodiment of the present disclosure, a large size roller bearing is a bearing with an outer diameter of at least 600, 700, 800, 900, 1000, 1100, 1200, 1300, 1400, or 1500 mm.

In an embodiment of the present disclosure, the roller bearing presents symmetrical rollers. In another embodiment, the rollers are asymmetrical rollers. The symmetry of the rollers is seen along the rotational axis of the roller elements. A roller is symmetrical if its center point, or center of gravity, is located on the roller's rotational axis and at an equal distance between the axial roller ends. A symmetrical and asymmetrical spherical roller element is something which is well recognized by the skilled person and described in literature (e.g. Rolling Bearing Analysis by Tedric A. Harris (ISBN 0-471-79979-3).

According to the second aspect of the disclosure, a wind turbine bearing arrangement is disclosed, wherein the arrangement comprises a rotor shaft connected to a hub, wherein rotor blades are connected to the hub. Furthermore, the arrangement comprises at least one bearing for rotatably supporting the rotor shaft, wherein the bearing is a double-row spherical roller bearing of any embodiment of the first aspect of the disclosure. It has been realized by the inventors that it would be advantageous to provide a bearing according to any of the embodiments of the first aspect of the disclosure to a wind turbine bearing arrangement. The bearing design would lead to that the contacting surface of the outer peripheral surface would be reduced and therefore bearing mounting would be facilitated. In addition, manufacturing costs of the outer ring could be reduced without affecting bearing performance. It shall be noted that any of the embodiments of the first aspect of the disclosure are applicable to any of the embodiments of the second aspect of the disclosure and vice versa.

BRIEF DESCRIPTION OF DRAWINGS

Exemplifying embodiments of the present disclosure will now be described in more detail, with reference to the accompanying drawings, wherein.

The drawings show diagrammatic exemplifying embodiments of the present disclosure and are thus not necessarily drawn to scale. It shall be understood that the embodiments shown and described are exemplifying and that the disclosure is not limited to these embodiments. It shall also be noted that some details in the drawings may be exaggerated in order to better describe and illustrate the disclosure.

DETAILED DESCRIPTION OF DRAWINGS

Figure 1:
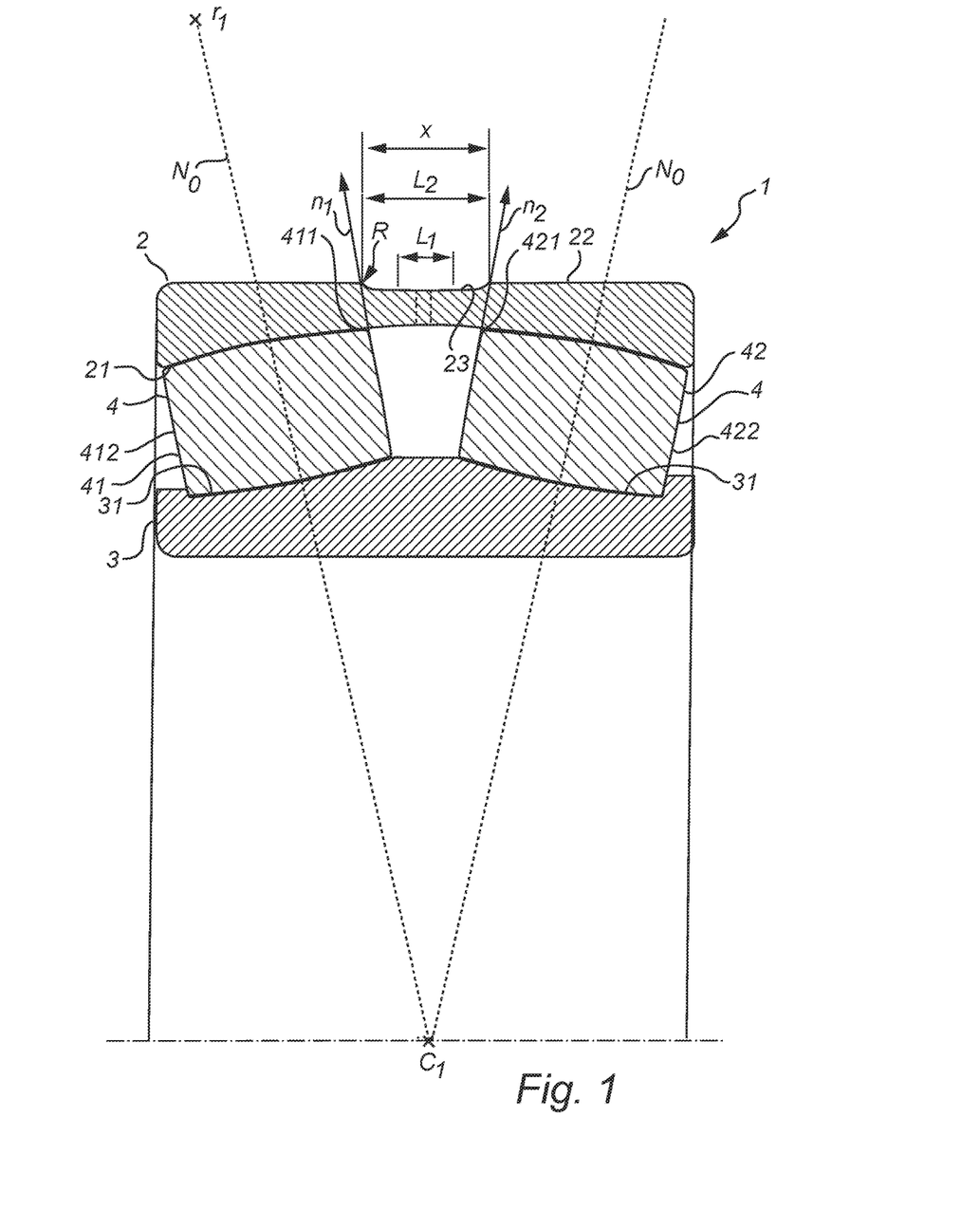
FIG. 1 shows a cross section of a spherical roller bearing according to an embodiment of the disclosure.

FIG. 1 shows a double-row spherical roller bearing 1 according to an embodiment of the present disclosure. The double-row spherical roller bearing 1 comprises an outer ring 2 presenting at least one radially inner spherical raceway 21 and a radially outer peripheral surface 22. Further, an inner ring 3 presents at least one radially outer curved-shaped raceway 31. Roller elements 4 are arranged in two roller rows 41 and 42 which are axially displaced, wherein the rollers 4 are arranged in-between the inner raceway 21 of the outer ring 2 and the at least one outer raceway 31 of the inner ring 3. Moreover, the roller elements 4 in each roller row 41 and 42 presents a nominal roller position $N_0$ in the bearing, wherein the outer ring 2 presents a first circumferential groove 23 on the outer peripheral surface 22 and wherein the first circumferential groove 23 has a width X and location on the outer peripheral surface 22 which fulfills the following relation:

$$L_1 \le X \le L_2,$$

wherein $L_2$ extends between a first and second axial end point on the outer peripheral surface 22, which first end point is defined as the intersection between a first normal vector $n_1$ and the outer peripheral surface 22, wherein the first normal vector $n_1$ is an inverted normal vector of the at least one inner raceway 21 and starts from a position located at the axially inner end face 411 of a roller 4 in the first roller row 41 at its nominal roller position $N_0$, and which second end point is defined as the intersection between a second normal vector $n_2$ of the at least one inner raceway 21 and the outer peripheral surface 22, wherein the second normal vector $n_2$ is an inverted normal vector of the at least one inner raceway 21 and starts from a position located at the axially inner end face 421 of a roller 4 in the second roller row 42 at its nominal roller position $N_0$. Furthermore, $L_1$ has a length of $L_2 * \frac{1}{3}$ and where the end points of $L_1$ are located with equal distances to each respective first and second end point of $L_2$. As can be seen in this figure, the nominal roller positions $N_0$ of the first and second roller row 41 and 42 is the roller position when the roller bearing 1 is unaffected by any external loads and when the outer and inner ring 2 and 3 is aligned, i.e. there is no misalignment between the two bearing rings 2 and 3. In addition there is no axial displacement of the two rings 2 and 3 when the rollers are in its nominal roller position $N_0$. The line $N_0$ of the roller 4 at the first roller row 41 is located at an equal distance from both axial end faces 411 and 412 of the roller 4 in the first roller row 41 and is also a normal to the inner raceway surface 21. In this embodiment, the roller 4 is a symmetrical roller. The line $N_0$ of the roller 4 at the second roller row 42 is located at an equal distance from both axial end faces 421 and 422 of the roller 4 in the second roller row 42 and is also a normal to the inner raceway surface 21. By nominal roller position is meant the position of the roller when the roller center point is located along the axis of the contact angle of the roller bearing. So the lines No in this figure also represent the contact angles of the first and second respective roller row 41 and 42. Furthermore the rotational axis of the roller 4 is perpendicular to the axis of the contact angle. In addition, the roller raceway is in contact with the inner ring raceway 41. The roller center point is on the plane defined by the rollers' largest diameter and which is perpendicular to the roller rotational axis. The contact angle of one of the rollers 4 in one of the roller rows 41 and 42 of the bearing 1 is defined as a line intersecting two points, wherein the first point C1 is the center point of the sphere defined by the inner raceway 21 of the outer ring 2 located on the rotational axis of the bearing 1, and wherein the second point is the radial centre r1 of the corresponding inner ring raceway surface. Furthermore, the skilled person is well aware of what is meant by the nominal roller position of a bearing. In this embodiment, the roller bearing 1 presents symmetrical rollers 4. However, the bearing 1 could also comprise asymmetrical rollers. Moreover, the first circumferential groove 23 also presents at its axial ends a smooth transition between the groove 23 and the outer peripheral surface 22. A radius R can be seen. In this embodiment the radius R is set to essentially 8 mm for manufacturing purposes. The outer ring 2 is also in this embodiment equipped with lubrication bores 25.

Figure 2:
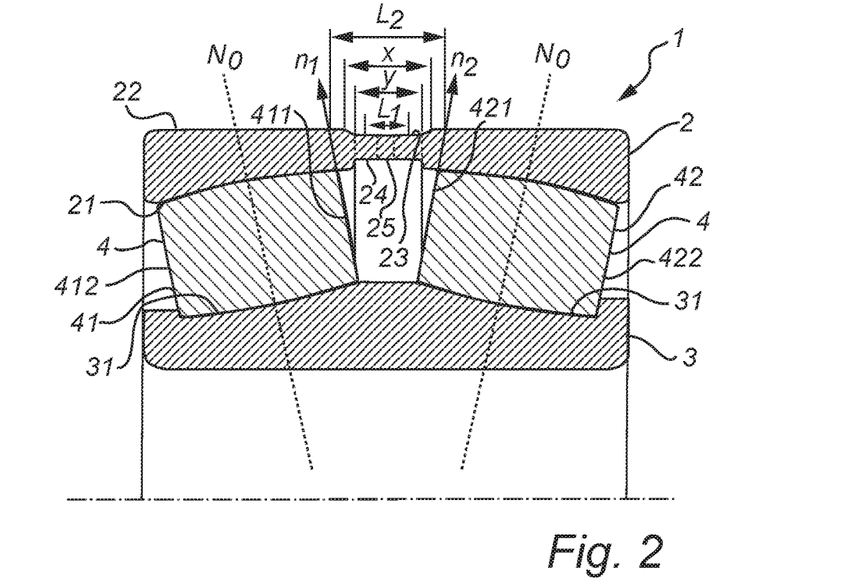
FIG. 2 shows another embodiment of a cross section of a spherical roller bearing according to the disclosure, wherein also an inner circumferential groove is present.

In FIG. 2, another embodiment of the present disclosure can be seen. The bearing 1 is a double-row spherical roller bearing and comprises an outer ring 2 presenting at least one radially inner spherical raceway 21 and a radially outer peripheral surface 22. An inner ring 3 presents at least one radially outer curved-shaped raceway 31. Roller elements 4 are arranged in two roller rows 41 and 42 which are axially displaced, wherein the rollers 4 are arranged in-between the inner raceway 21 of the outer ring 2 and the at least one outer raceway 31 of the inner ring 3. Moreover, the roller elements 4 in each roller row 41 and 42 presents a nominal roller position $N_0$ in the bearing, wherein the outer ring 2 presents a first circumferential groove 23 on the outer peripheral surface 22 and wherein the first circumferential groove 23 has a width X and location on the outer peripheral surface 22 which fulfills the following relation:

$$L_1 \le X \le L_2,$$

wherein $L_2$ extends between a first and second axial end point on the outer peripheral surface 22, which first end point is defined as the intersection between a first normal vector $n_1$ and the outer peripheral surface 22, wherein the first normal vector $n_1$ is an inverted normal vector of the at least one inner raceway 21 and starts from a position located at the axially inner end face 411 of a roller 4 in the first roller row 41 at its nominal roller position $N_0$, and which second end point is defined as the intersection between a second normal vector $n_2$ of the at least one inner raceway 21 and the outer peripheral surface 22, wherein the second normal vector $n_2$ is an inverted normal vector of the at least one inner raceway 21 and starts from a position located at the axially inner end face 421 of a roller 4 in the second roller row 42 at its nominal roller position $N_0$. Furthermore, $L_1$ has a length of $L_2 * \frac{1}{3}$ and where the end points of $L_1$ are located with equal distances to each respective first and second end point of $L_2$. As can be seen from the figure, the axial width X is in this embodiment in-between the axial distances $L_2$ and $L_1$. For instance, if $L_2$ is about 78 mm, and if $L_1$ is $L_2 * \frac{1}{3}$, it would mean that $L_1$ would be about 26 mm and that the distance X of the first circumferential groove 23 is a distance somewhere in-between $L_2$ and $L_1$. In an embodiment, X is essentially 56 mm. Moreover, in this embodiment, a second circumferential groove 24 is present on the inner raceway 21 of the outer ring 2. The groove 24 is located axially in-between the two roller rows 41 and 42 and has an axial width y. It may also be advantageous to make a groove on the radially inner side of the outer ring in-between the two roller rows. As for the first circumferential groove 23, by having a groove 24 on the radially inner side 21 of the outer ring 2, the manufacturing process for making the inner raceway 21 will be simplified. A reduced surface area needs to be processed which reduces cycle times in production. In addition, by having a groove 24, cooling of the hard machining tools will be improved. For instance, if the inner raceway 21 is cup-polished, the risk of overheating of the cup will be reduced when there is a groove 24 on the radially inner side 21 of the outer ring 2 which divides the inner raceway 21 into two spherical inner raceways. The outer ring 2 is also in this embodiment equipped with lubrication bores 25.

Figure 3:
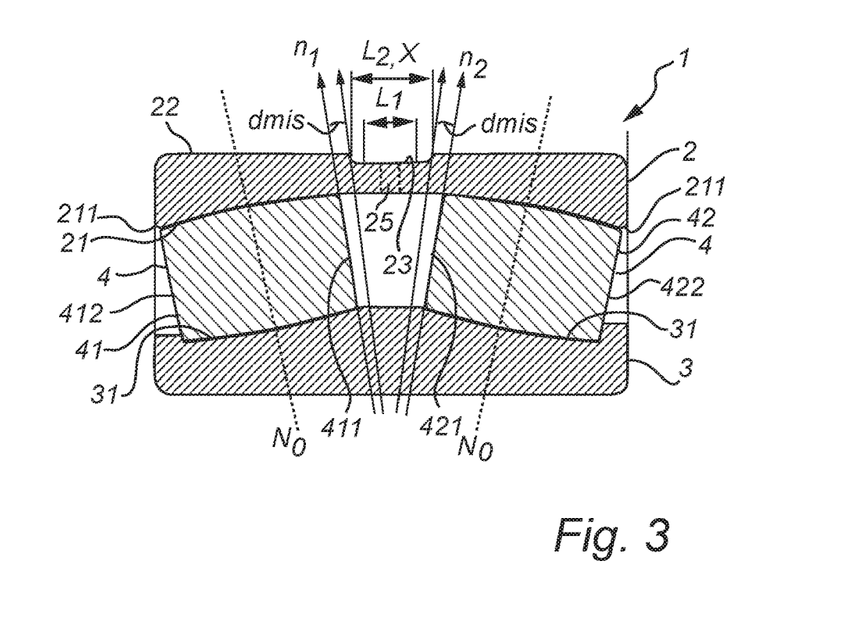
FIG. 3 shows another cross section of an embodiment of the present disclosure, where the first circumferential groove has an axial width which takes the misalignment limit into account.

Now going to FIG. 3, wherein another embodiment of a double-row spherical roller bearing 1 can be seen. The bearing 1 comprises an outer ring 2 presenting at least one radially inner spherical raceway 21 and a radially outer peripheral surface 22. An inner ring 3 presents at least one radially outer curved-shaped raceway 31. Roller elements 4 are arranged in two roller rows 41 and 42 which are axially displaced, wherein the rollers 4 are arranged in-between the inner raceway 21 of the outer ring 2 and the at least one outer raceway 31 of the inner ring 3. Moreover, the roller elements 4 in each roller row 41 and 42 presents a nominal roller position $N_0$ in the bearing, wherein the outer ring 2 presents a first circumferential groove 23 on the outer peripheral surface 22 and wherein the first circumferential groove 23 has a width X and location on the outer peripheral surface 22 which fulfills the following relation:

$$L_1 \leq X \leq L_2,$$

wherein $L_2$ extends between a first and second axial end point on the outer peripheral surface 22, which first end point is defined as the intersection between a first normal vector $n_1$ and the outer peripheral surface 22, wherein the first normal vector $n_1$ is an inverted normal vector of the at least one inner raceway 21 and starts from a position located at the axially inner end face 411 of a roller 4 in the first roller row 41 at its nominal roller position $N_0$, and which second end point is defined as the intersection between a second normal vector $n_2$ of the at least one inner raceway 21 and the outer peripheral surface 22, wherein the second normal vector $n_2$ is an inverted normal vector of the at least one inner raceway 21 and starts from a position located at the axially inner end face 421 of a roller 4 in the second roller row 42 at its nominal roller position $N_0$. Furthermore, $L_1$ has a length of $L_2 * \frac{1}{3}$ and where the end points of $L_1$ are located with equal distances to each respective first and second end point of $L_2$. Furthermore, in this embodiment, the distance $L_2$ has been displaced further and reduced by an angle $d_{mis}$ from the normals $n_1$ and $n_2$ based on the misalignment limit of the bearing. The spherical roller bearing 1 presents a misalignment limitation which is based on the axial extension of the spherical surface 21 on the radially inner side of the outer ring 2. If the bearing 1 would be misaligned so that rollers 4 will be partly outside the spherical inner surface 21, bearing performance could be affected negatively. Therefore the bearing's 1 misalignment limit is set to the limit when the roller elements 4 will reach the axial end 211 of the spherical inner raceway surface 21. By displacing at least one of the end points of $L_2$ by the misalignment limit of the bearing from the intersection of the respective first and second normal vector $n_1$, $n_2$ and the outer peripheral surface, the bearing's 1 performance will be less affected, especially for applications where the bearing tends to be largely misaligned. In this embodiment, both end points of the groove 23 have been axially displaced. However, in another embodiment, only one of the end points is axially displaced. The outer ring 2 is also in this embodiment equipped with lubrication bores 25.

Figure 4:
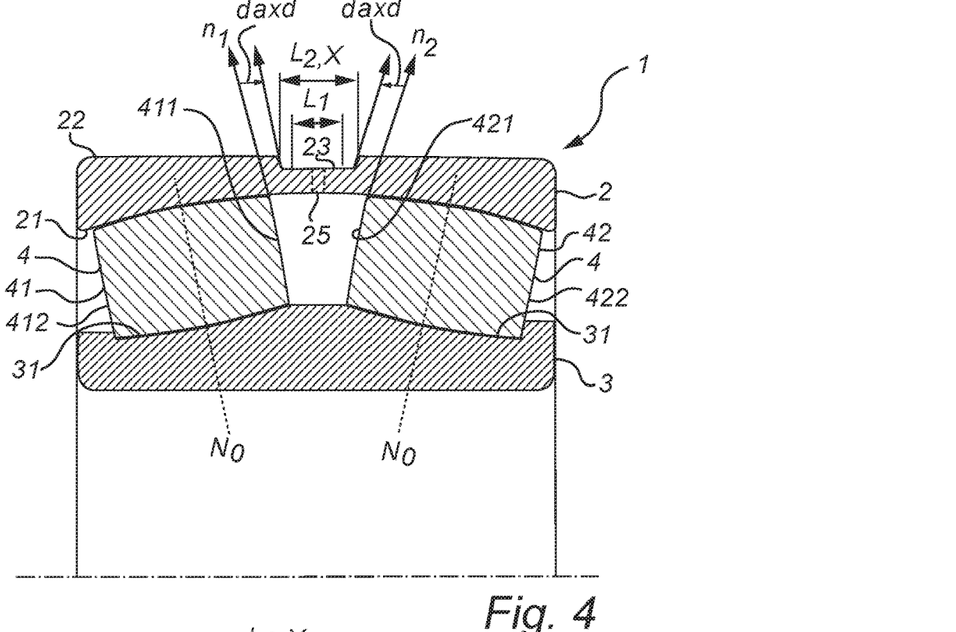
FIG. 4 shows another cross section of an embodiment of the present disclosure, where the first circumferential groove has an axial width which takes the relative axial displacement of the inner and outer ring into account.

In FIG. 4, another embodiment of the present disclosure is disclosed. The bearing 1 is a double-row spherical roller bearing and comprises an outer ring 2 presenting at least one radially inner spherical raceway 21 and a radially outer peripheral surface 22. An inner ring 3 presents at least one radially outer curved-shaped raceway 31. Roller elements 4 are arranged in two roller rows 41 and 42 which are axially displaced, wherein the rollers 4 are arranged in-between the inner raceway 21 of the outer ring 2 and the at least one outer raceway 31 of the inner ring 3. Moreover, the roller elements 4 in each roller row 41 and 42 presents a nominal roller position $N_0$ in the bearing, wherein the outer ring 2 presents a first circumferential groove 23 on the outer peripheral surface 22 and wherein the first circumferential groove 23 has a width X and location on the outer peripheral surface 22 which fulfills the following relation:

$$L_1 \leq X \leq L_2,$$

wherein $L_2$ extends between a first and second axial end point on the outer peripheral surface 22, which first end point is defined as the intersection between a first normal vector $n_1$ and the outer peripheral surface 22, wherein the first normal vector $n_1$ is an inverted normal vector of the at least one inner raceway 21 and starts from a position located at the axially inner end face 411 of a roller 4 in the first roller row 41 at its nominal roller position $N_0$, and which second end point is defined as the intersection between a second normal vector $n_2$ of the at least one inner raceway 21 and the outer peripheral surface 22, wherein the second normal vector $n_2$ is an inverted normal vector of the at least one inner raceway 21 and starts from a position located at the axially inner end face 421 of a roller 4 in the second roller row 42 at its nominal roller position $N_0$. Furthermore, $L_1$ has a length of $L_2 * \frac{1}{3}$ and where the end points of $L_1$ are located with equal distances to each respective first and second end point of $L_2$. Furthermore, in this embodiment, the distance $L_2$ has been axially displaced further and reduced by a distance $d_{axd}$ from the normals $n_1$ and $n_2$ based on the axial displaceability of the outer ring 2 and the inner ring 3. The bearing 1 presents a clearance which results in that the inner ring 3 and the outer ring 2 can be relatively axially displaced a distance $d_{axd}$. Therefore, end points of $L_2$ have been moved axially inwardly a distance $d_{axd}$ to thereby compensate for the bearing's internal clearance. In this embodiment, both end points of the groove 23 have been axially displaced. However, in another embodiment, only one of the end points is axially displaced. The outer ring 2 is also in this embodiment equipped with lubrication bores 25.

Figure 5:
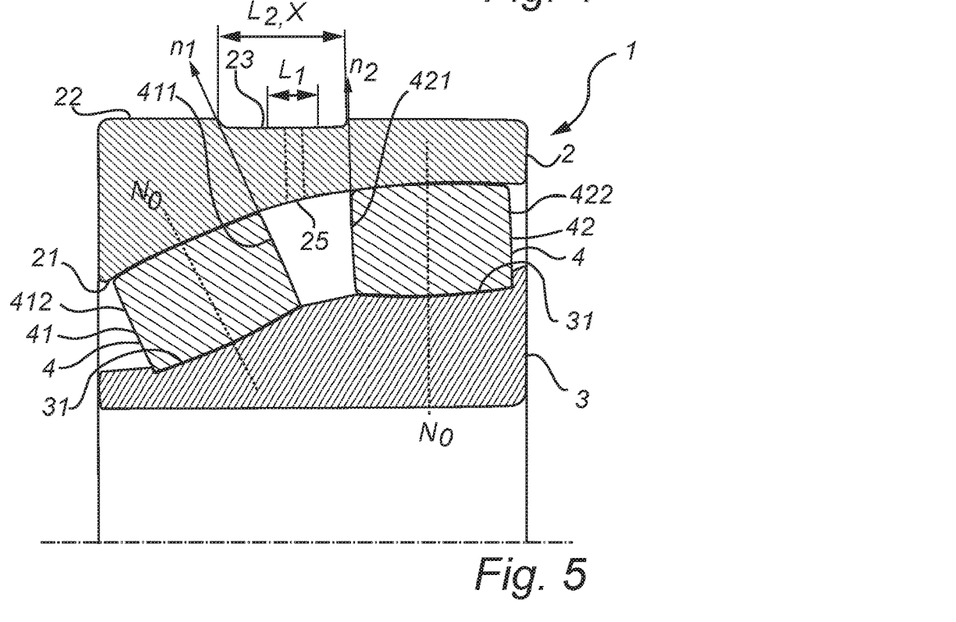
FIG. 5 shows another cross section of an embodiment of the present disclosure, wherein an asymmetric spherical roller bearing is disclosed comprising a first circumferential groove.

FIG. 5 discloses another embodiment of the present disclosure. The bearing 1 in this embodiment is an asymmetrical double-row spherical roller bearing. The bearing's 1 asymmetry is due to that the first and second roller rows 41 and 42 present different contact angles. In addition the rollers in the first row 41 presents a width which is larger than the width of the rollers in the second roller row 42. The asymmetry could either be due to a combination of different contact angles and different roller widths between the roller rows 41 and 42, but an asymmetry could also be present by only having different contact angles or different roller widths between the rows 41 and 42. As further can be seen, the rollers 4 in the first and second roller rows 41 and 42 presents a nominal roller position $N_0$. The bearing 1 is a double-row spherical roller bearing and comprises an outer ring 2 presenting at least one radially inner spherical raceway 21 and a radially outer peripheral surface 22. An inner ring 3 presents at least one radially outer curved-shaped raceway 31. Roller elements 4 are arranged in two roller rows 41 and 42 which are axially displaced, wherein the rollers 4 are arranged in-between the inner raceway 21 of the outer ring 2 and the at least one outer raceway 31 of the inner ring 3. Moreover, the roller elements 4 in each roller row 41 and 42 presents a nominal roller position No in the bearing, wherein the outer ring 2 presents a first circumferential groove 23 on the outer peripheral surface 22 and wherein the first circumferential groove 23 has a width X and location on the outer peripheral surface 22 which fulfills the following relation:

$$L_1 \leq X \leq L_2,$$

wherein $L_2$ extends between a first and second axial end point on the outer peripheral surface 22, which first end point is defined as the intersection between a first normal vector $n_1$ and the outer peripheral surface 22, wherein the first normal vector $n_1$ is an inverted normal vector of the at least one inner raceway 21 and starts from a position located at the axially inner end face 411 of a roller 4 in the first roller row 41 at its nominal roller position $N_0$, and which second end point is defined as the intersection between a second normal vector $n_2$ of the at least one inner raceway 21 and the outer peripheral surface 22, wherein the second normal vector $n_2$ is an inverted normal vector of the at least one inner raceway 21 and starts from a position located at the axially inner end face 421 of a roller 4 in the second roller row 42 at its nominal roller position $N_0$. Furthermore, $L_1$ has a length of $L_2 * \frac{1}{3}$ and where the end points of $L_1$ are located with equal distances to each respective first and second end point of $L_2$. In this embodiment, the width X is essentially the same as the distance $L_2$.

Figure 6:
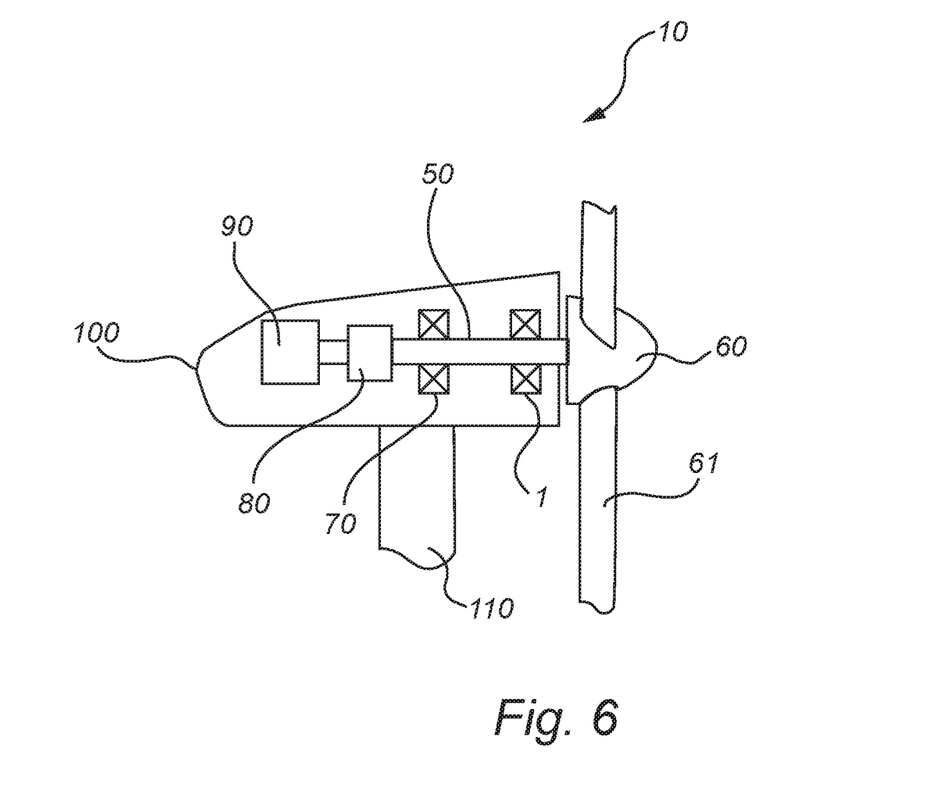
FIG. 6 shows a cross section of a wind turbine bearing arrangement according to an embodiment of the second aspect of the disclosure.

FIG. 6 discloses an embodiment of the second aspect of the present disclosure. A wind turbine bearing arrangement 10 is disclosed, comprising a rotor shaft 50 connected to a hub 60, wherein rotor blades 61 are connected to the hub 60. Furthermore, the arrangement comprises at least one bearing 1 for rotatably supporting the rotor shaft 50, wherein the bearing 1 is a double-row spherical roller bearing 1 according to any embodiment of the first aspect of the disclosure. The rotor shaft 50 is further supported by a second bearing 70. The bearings 1 and 70 are rotatably connected to the rotor shaft 50 and fitted into a housing structure (not shown), which in turn is connected to a nacelle 100 of the wind turbine 10. The rotor shaft 50 is connected to a generator 90. The torque generated from the blades 61 is transferred to the rotor shaft 50 and the torque is supplied to the generator 90 via a gearbox 80. There are also examples of wind turbines having no gearbox. The second bearing 70 can be any suitable bearing. For instance, the second bearing 70 is a toroidal roller bearing, a conical roller bearing or another spherical roller bearing according to any embodiment of the disclosure. The bearing arrangement in the wind turbine may be a two-point suspension or a three-point suspension arrangement.

For all the figures, no cage or retainer can be seen. Nor any guide ring can be seen. This does not mean that there cannot be a cage or that there is no cage and guide ring present for any of the embodiments. The reason for not illustrating a cage and guide ring in any of the figures is mainly due to be able to in a better way illustrate the present disclosure.

What is claimed is:

1. A double-row spherical roller bearing, comprising,
an outer ring presenting at least one radially inner spherical raceway and a radially outer peripheral surface;
an inner ring presenting at least one radially outer curved-shaped raceway;
roller elements arranged in two roller rows which are axially displaced from each other, and being arranged in-between the inner raceway of the outer ring and the at least one outer raceway of the inner ring,
wherein the roller elements in each roller row presents a nominal roller position in the bearing,
wherein the outer ring presents a first circumferential groove on the outer peripheral surface and wherein the first circumferential groove presents a width X and location on the outer peripheral surface which fulfills the following relation:

$$L_1 \leq X \leq L_2,$$

wherein $L_2$ extends between a first and second axial end point on the outer peripheral surface, which first end point is defined as the intersection between a first normal vector and the outer peripheral surface,
wherein the first normal vector is an inverted normal vector of the at least one inner raceway and starts from a position located at the axially inner end face of a roller in the first roller row at its nominal roller position, and which second end point is defined as the intersection between a second normal vector and the outer peripheral surface,
wherein the second normal vector is an inverted normal vector of the at least one inner raceway and starts from a position located at the axially inner end face of a roller in the second roller row at its nominal roller position,
wherein $L_1$ has a length of $L_2 * \frac{1}{3}$ and where the end points of $L_1$ are located with equal distances to each respective first and second end point of $L_2$.

2. The double-row spherical roller bearing according to claim 1,
wherein the axial width X is substantially constant in the circumferential direction of the first circumferential groove.

3. The double-row spherical roller bearing according to claim 1,
wherein the outer ring presents a second circumferential groove located on the at least one inner spherical raceway and axially between the first roller row and the second roller row.

4. The double-row spherical roller bearing according to claim 3,
wherein the second circumferential groove presents an axial width which is substantially constant in a circumferential direction thereof.

5. The double-row spherical roller bearing according to claim 3,
wherein the second circumferential groove presents an axial width being less than or equal to the axial width X of the first circumferential groove.

6. The double-row spherical roller bearing according to claim 3,
wherein the second circumferential groove is substantially radially aligned with the first circumferential groove.

7. The double-row spherical roller bearing according to claim 1,
wherein the outer ring presents at least one radial lubrication bore for allowing lubricant to enter the inside of the bearing in-between the outer and inner ring,
wherein the at least one lubrication bore is located at the first circumferential groove.

8. The double-row spherical roller bearing according to claim 1, wherein the first circumferential groove presents a radial depth being less than 6 mm.

9. The double-row spherical roller bearing according to claim 1,
wherein the outer ring has been subjected to a hardening process,
wherein the outer peripheral surface is a hard turned surface,
wherein the first circumferential groove has not undergone any post-turning operation after it was hardened.

10. The double-row spherical roller bearing according to claim 1,
wherein the first circumferential groove presents a first radius corresponding to the first axial end point of the first circumferential groove and a second radius corresponding to at the second axial end point of the first circumferential groove, and
wherein the first radius and the second radius are substantially 6-10 mm.

11. The double-row spherical roller bearing according to claim 1,
wherein the first circumferential groove presents a first radius corresponding to the first axial end point of the first circumferential groove and a second radius corresponding to the second axial end point of the first circumferential groove, and
wherein the first radius and the second radius are substantially 8 mm.

12. A double-row spherical roller bearing, comprising:
an outer ring presenting at least one radially inner spherical raceway and a radially outer peripheral surface;
an inner ring presenting at least one radially outer curved-shaped raceway;
roller elements arranged in two roller rows which are axially displaced from each other, and being arranged in-between the inner raceway of the outer ring and the at least one outer raceway of the inner ring,
wherein the roller elements in each roller row presents a nominal roller position in the bearing,
wherein the outer ring presents a first circumferential groove on the outer peripheral surface and wherein the first circumferential groove presents a width X and location on the outer peripheral surface which fulfills the following relation:

$$L_1 \leq X \leq L_2,$$

wherein $L_2$ extends between a first and second axial end point on the outer peripheral surface, which first end point is defined as the intersection between a first normal vector and the outer peripheral surface,
wherein the first normal vector is an inverted normal vector of the at least one inner raceway and starts from a position located at the axially inner end face of a roller in the first roller row at its nominal roller position, and which second end point is defined as the intersection between a second normal vector and the outer peripheral surface,
wherein the second normal vector is an inverted normal vector of the at least one inner raceway and starts from a position located at the axially inner end face of a roller in the second roller row at its nominal roller position, and
wherein $L_1$ has a length of $L_2*0.4$ or $L_2*0.5$ or $L_2*0.6$ or $L_2*0.7$ or $L_2*0.8$ or $L_2*0.9$.

13. A wind turbine bearing arrangement, comprising,
a rotor shaft connected to a hub, wherein rotor blades are connected to the hub,
at least one bearing for rotatably supporting the rotor shaft, wherein the bearing is a double-row spherical roller bearing, the double-row spherical roller bearing comprising:
an outer ring presenting at least one radially inner spherical raceway and a radially outer peripheral surface;
an inner ring presenting at least one radially outer curved-shaped raceway;
roller elements arranged in two roller rows which are axially displaced from each other, and being arranged in-between the inner raceway of the outer ring and the at least one outer raceway of the inner ring,
wherein the roller elements in each roller row presents a nominal roller position in the bearing,
wherein the outer ring presents a first circumferential groove on the outer peripheral surface and wherein the first circumferential groove presents a width X and location on the outer peripheral surface which fulfills the following relation:

$$L_1 \leq X \leq L_2,$$

wherein $L_2$ extends between a first and second axial end point on the outer peripheral surface, which first end point is defined as the intersection between a first normal vector and the outer peripheral surface,
wherein the first normal vector is an inverted normal vector of the at least one inner raceway and starts from a position located at the axially inner end face of a roller in the first roller row at its nominal roller position, and which second end point is defined as the intersection between a second normal vector and the outer peripheral surface,
wherein the second normal vector is an inverted normal vector of the at least one inner raceway and starts from a position located at the axially inner end face of a roller in the second roller row at its nominal roller position,
wherein $L_1$ has a length of $L_2*\frac{1}{3}$ and where the end points of $L_1$ are located with equal distances to each respective first and second end point of $L_2$.

* * * * *